(12) United States Patent
Britting

(10) Patent No.: US 12,416,590 B2
(45) Date of Patent: Sep. 16, 2025

(54) SUBSTRATE ALLOY INFLUENCE COMPENSATION

(71) Applicant: Thermo Fisher Scientific Messtechnik GmbH, Erlangen (DE)

(72) Inventor: Alexander Britting, Lauf a. d. Pegnitz (DE)

(73) Assignee: Thermo Fisher Scientific Messtechnik GmbH, Erlangen (DE)

( * ) Notice: Subject to any disclaimer, the term of this patent is extended or adjusted under 35 U.S.C. 154(b) by 0 days.

(21) Appl. No.: 18/245,916

(22) PCT Filed: Mar. 17, 2023

(86) PCT No.: PCT/EP2023/056970
§ 371 (c)(1),
(2) Date: Mar. 20, 2023

(87) PCT Pub. No.: WO2023/180213
PCT Pub. Date: Sep. 28, 2023

(65) Prior Publication Data
US 2025/0003897 A1    Jan. 2, 2025

Related U.S. Application Data

(60) Provisional application No. 63/269,852, filed on Mar. 24, 2022.

(51) Int. Cl.
*G01N 23/2204* (2018.01)
*G01N 23/20025* (2018.01)
(Continued)

(52) U.S. Cl.
CPC ... *G01N 23/2204* (2013.01); *G01N 23/20025* (2013.01); *G01N 23/203* (2013.01);
(Continued)

(58) Field of Classification Search
CPC .......... G01N 23/20025; G01N 23/203; G01N 23/2204; G01N 23/223; G01N 2223/053;
(Continued)

(56) References Cited

U.S. PATENT DOCUMENTS 2,951,161 A * 8/1960 Foster .................. G01N 23/203
378/89
3,499,152 A * 3/1970 Hetenhouser ........ G01N 23/203
378/89
(Continued)

FOREIGN PATENT DOCUMENTS

JP      2014048274 A     3/2014
WO     WO-2014038406 A1  3/2014

OTHER PUBLICATIONS

PCT/EP2023/056970, International Search Report and Written Opinion, Jun. 19, 2023, 9 pages.

*Primary Examiner* — Thomas R Artman
(74) *Attorney, Agent, or Firm* — William R. McCarthy, III

(57) ABSTRACT

A method for compensating for substrate variation in measurement of material quantity of a material positioned on a substrate is described. The method includes receiving a detected X-ray signal for a measurement of the material at a position on a surface of the substrate; and determining a material quantity based on the received X-ray measurement signal and a pre-determined set of compensation parameters for the substrate, the set of compensation parameters varying according to the position on the surface of the substrate.

17 Claims, 10 Drawing Sheets

(51) Int. Cl.
*G01N 23/203* (2006.01)
*G01N 23/223* (2006.01)

(52) U.S. Cl.
CPC ..... *G01N 23/223* (2013.01); *G01N 2223/053* (2013.01); *G01N 2223/076* (2013.01); *G01N 2223/1016* (2013.01); *G01N 2223/303* (2013.01); *G01N 2223/304* (2013.01); *G01N 2223/3075* (2013.01); *G01N 2223/33* (2013.01); *G01N 2223/61* (2013.01); *G01N 2223/633* (2013.01); *G01N 2223/642* (2013.01)

(58) Field of Classification Search
CPC ..... G01N 2223/076; G01N 2223/1016; G01N 2223/303; G01N 2223/304; G01N 2223/3075; G01N 2223/33; G01N 2223/61; G01N 2223/633; G01N 2223/642
See application file for complete search history.

(56) References Cited

U.S. PATENT DOCUMENTS

| | | | | |
|---|---|---|---|---|
| 7,242,747 | B2 * | 7/2007 | Zerle | G01N 23/203 378/90 |
| 7,980,760 | B2 * | 7/2011 | Kabumoto | G01N 23/04 378/207 |
| 9,727,961 | B2 * | 8/2017 | Wang | G01V 5/22 |
| 9,829,448 | B2 * | 11/2017 | Wormington | G01N 23/223 |
| 10,031,256 | B2 * | 7/2018 | Bridger | G01V 5/22 |
| 10,761,038 | B2 * | 9/2020 | Murray | G01N 33/12 |
| 10,782,253 | B2 * | 9/2020 | Birnbaum | G01N 23/2202 |
| 11,138,716 | B2 * | 10/2021 | Sugimoto | G06T 7/0002 |
| 2005/0163282 | A1 * | 7/2005 | Zerle | G01G 9/005 378/88 |
| 2008/0187835 | A1 * | 8/2008 | Takezawa | H01M 4/0421 118/712 |
| 2010/0002835 | A1 * | 1/2010 | Kabumoto | G01N 23/04 378/207 |
| 2015/0003583 | A1 * | 1/2015 | Wang | G06T 7/194 378/57 |
| 2015/0192690 | A1 * | 7/2015 | Bridger | G01V 5/22 378/57 |
| 2016/0123909 | A1 | 5/2016 | Wormington et al. | |
| 2017/0010228 | A1 | 1/2017 | Birnbaum et al. | |
| 2019/0257773 | A1 * | 8/2019 | Murray | G01N 33/12 |
| 2020/0302590 | A1 * | 9/2020 | Sugimoto | G06T 7/0002 |
| 2023/0184698 | A1 * | 6/2023 | Britting | G01N 23/06 250/252.1 |
| 2025/0003897 | A1 * | 1/2025 | Britting | G01N 23/203 |

\* cited by examiner

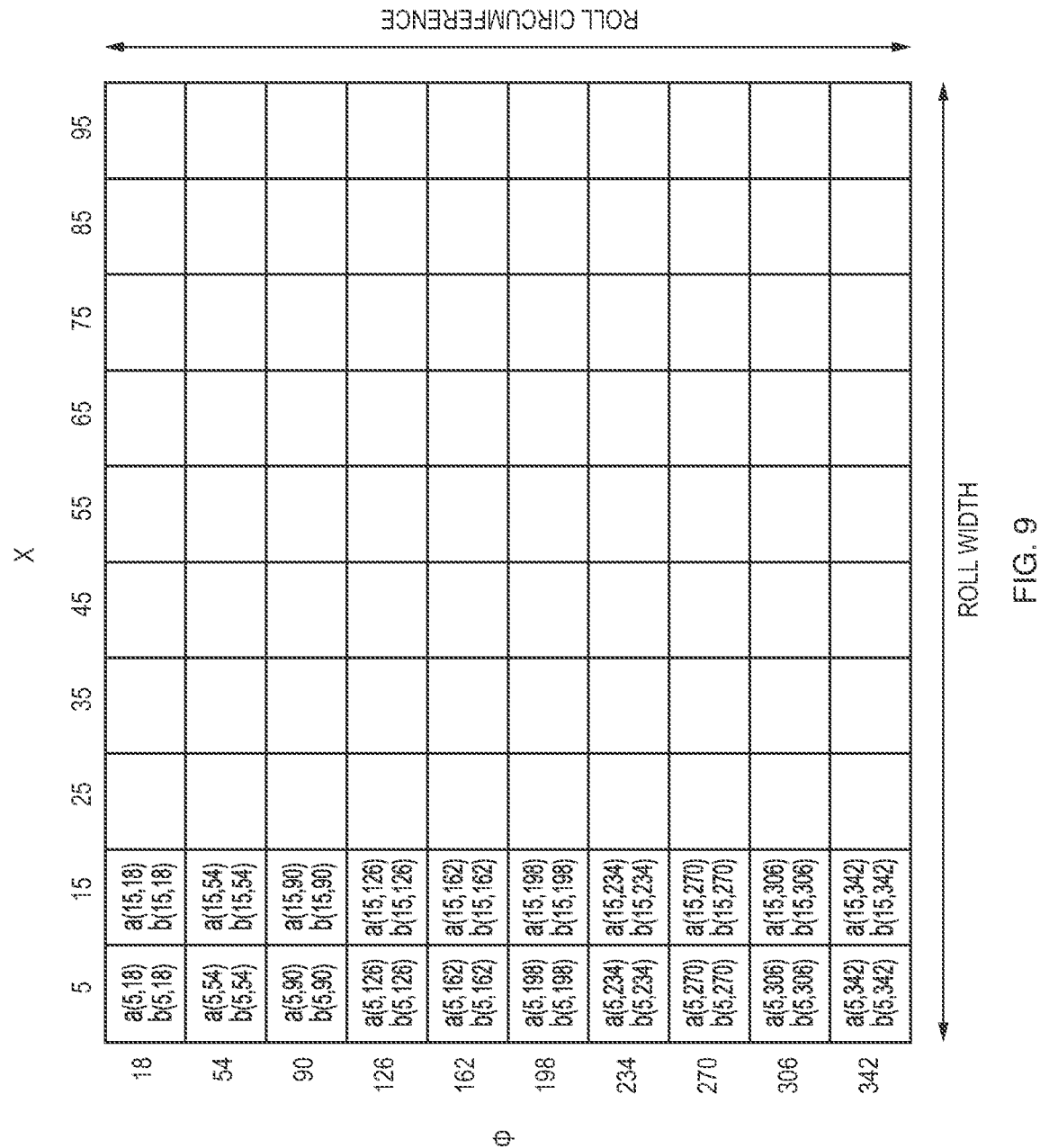

SUBSTRATE ALLOY INFLUENCE COMPENSATION

CROSS-REFERENCE TO RELATED APPLICATIONS

The present application claims the priority benefit from U.S. Patent Application Ser. No. 63/269,852, filed Mar. 24, 2023, which is hereby incorporated by reference herein in its entirety for all purposes.

FIELD OF THE DISCLOSURE

The disclosure concerns a method for compensating for substrate variation in X-ray measurement of material quantity of a material positioned on a substrate, a method for determining compensation parameters for substrate variation in X-ray measurement of material quantity of a material positioned on a substrate and an X-ray analysis system.

BACKGROUND OF THE DISCLOSURE

X-ray scattering and X-ray fluorescence (XRF) analysis are used in a variety of non-contact industrial process measurements, particularly for thickness gauging. For example, these techniques can be used for monitoring the thickness of a material such as a web or a coating applied to a web conveyed over conveyor rolls. The rolls may have a surface coating and the measurement may then be made on the basis that this surface coating is uniform across the complete surface of the roll.

Referring to FIG. 1, there is shown an example X-ray sensor head arrangement for a web gauging process. This arrangement comprises: a roll 10; and X-ray sensor head 20. The X-ray sensor head 20 emits X-rays that are directed at the material, such as a web, passing over the roll 10 and detects the returned scattered X-rays or X-ray fluorescence as a voltage signal. As material thickness increases, the scattered radiation and X-ray fluorescence is modulated, such as increasing or decreasing.

During processing, the roll 10 rotates and the sensor 20 moves along the width of the roll (x), such that a detected voltage signal is a function of the cylindrical coordinates of the roll (x, φ) and time (t). The detected voltage signal can then be correlated to a thickness or a basis weight of a material such as a web or coated web, a, by linearizing according to a calibration curve. The voltage signal can also be compensated for temperature before any correlation based on the calibration curve is performed.

As industrial processing advances, maintaining and improving the accuracy of such measurement is a significant challenge.

SUMMARY OF THE DISCLOSURE

The present disclosure stems from the new recognition that the surface coating of a substrate providing a surface on which a material to be measured by X-ray analysis is positioned (for example, a conveyor roll) may become damaged. A filler material, typically comprising multiple elements (which are often different from the surface coating of the rolls) may be used to repair the substrate. Such repairs may be necessary for the industrial process.

It was previously expected that the substrate surface during X-ray analysis is smooth with a uniform coating across the complete surface. However, the additional filler materials have been found to affect the detected X-ray signal, such as an XRF or an X-ray scattering signal, leading to measurement inaccuracy. The filler materials may absorb an XRF signal or provide additional XRF signal, for instance and change the spectra thereby. Or, the filler material may cause more X-ray scattering, or less X-ray scattering, that will change the X-ray signal. In one aspect, the present disclosure provides techniques for compensating for this inaccuracy.

The compensation is achieved by identifying a set of compensation parameters for the substrate surface. The parameters are position-dependent (that is, they vary according to the position on the substrate surface being measured). As the measurement is carried out for multiple positions on the substrate surface, the set of compensation parameters generally covers multiple positions. The parameters are applied in the process of correlating (linearization) the detected X-ray signal to a material quantity, for example a thickness, a basis weight, or a coating weight. This linearization typically uses a predetermined calibration curve. If the substrate surface has a substantially cylindrical shape (for example, a roll or a conveyor belt, which can be seen as a squashed cylinder shape, or a cylinder with a slightly non-circular cross section), each position on the substrate surface may be defined by cylindrical coordinates (a position along a width of the substrate surface and a rotational angle of the substrate).

The X-ray signal may be voltage sampled or charge integrated. The signal is typically time-averaged over a (constant) measurement time period.

Specific parameters that may be used may include one or more of: (a) a normalization factor (shutter open signal) for the open voltage ($V_{0,\,Sub}$); (b) a spectral adjustment coefficient for the determined coating weight (a); and (c) a temperature compensation coefficient for the voltage signal (b). Note that the substrate may be subject to temperature variation, for example due to heating of the substrate (e.g., in the case of a roll). Since these parameters are position-dependent (that is, they differ for each position on the substrate surface), a database of the parameters in respect of a specific substrate may be provided for compensation purposes, which may be stored in non-volatile memory.

In practice, a measured voltage may be normalized using the normalization factor or shutter open signal by dividing the measured voltage by the normalization factor or shutter open signal (with both being reduced by a saturation voltage before division). A measured voltage may be temperature compensated by applying the temperature compensation coefficient (preferably together with a temperature compensation factor) to the measured voltage and preferably to the measured voltage normalized by the normalization factor or shutter open signal. The spectral adjustment coefficient for the determined coating weight may be multiplied by a coating weight determined from a measured voltage and preferably determined from the measured voltage normalized by the normalization factor or shutter open signal and/or compensated by the temperature compensation coefficient.

In an aspect (which may be combined with any other aspect disclosed herein), the present disclosure provides a method for determining the compensation parameters. This may be achieved by obtaining a detected X-ray signal for each of multiple positions on a surface of the substrate (and generally, multiple X-ray signals for each position, with different conditions for each of the signals). Then, a set of compensation parameters for each position on the surface of the substrate may be established from the respective detected X-ray signal or signals.

For instance, the shutter open signal for a position on the substrate may be established by measuring the position of the surface of the substrate with no material positioned on the substrate (e.g., no material positioned between the sensor head and the substrate). The shutter open signal for a position may then comprise the obtained detected X-ray signal at that position. Effectively, in implementations using a roll, the bare roll surface is mapped. That is, every square centimeter of the roll surface is measured by the X-ray sensor using a synchronized scanning motion across the roll width and rotation angle of the roll.

In another example, a spectral adjustment coefficient may be determined by measuring an X-ray signal for each position on the surface of the substrate, when a material of a known material quantity (for instance, thickness) is positioned at a predetermined position relative to (or distance from) an X-ray sensor. The spectral adjustment coefficient for each position may be established by comparing a material quantity (for example, basis or material weight) determining for the respective position and comparing it with the known material quantity. In determining the material quantity, the previously established shutter open signal is preferably used.

A temperature compensation coefficient may be established by measuring the surface of the substrate with no material positioned on the substrate at a different (typically, higher) temperature than for the measurement made to establish the shutter open signal. A temperature compensation factor may be identified (normally, calculated) for this temperature and the temperature compensation coefficient may be established by comparing the shutter open signal (or equivalently, another measurement made with no material on the substrate at a first temperature) adjusted by the temperature compensation factor with the measured X-ray signal.

Any aspect may be embodied as a computer program (software and/or firmware, for instance), which may be provided on a computer readable medium. Additionally or alternatively, an aspect may be found in hardware, for instance an X-ray analysis system. The system may comprise features configured to implement any of the method aspects and/or features. These may include an X-ray sensor; and/or a processor.

BRIEF DESCRIPTION OF THE DRAWINGS

The disclosure may be put into practice in a number of ways, and preferred embodiments will now be described by way of example only and with reference to the accompanying drawings, in which:

FIG. 9 depicts a mapped substrate, according to an embodiment.

Like reference numerals indicate corresponding features. All drawings should be understood as schematic.

DETAILED DESCRIPTION

Figure 1:
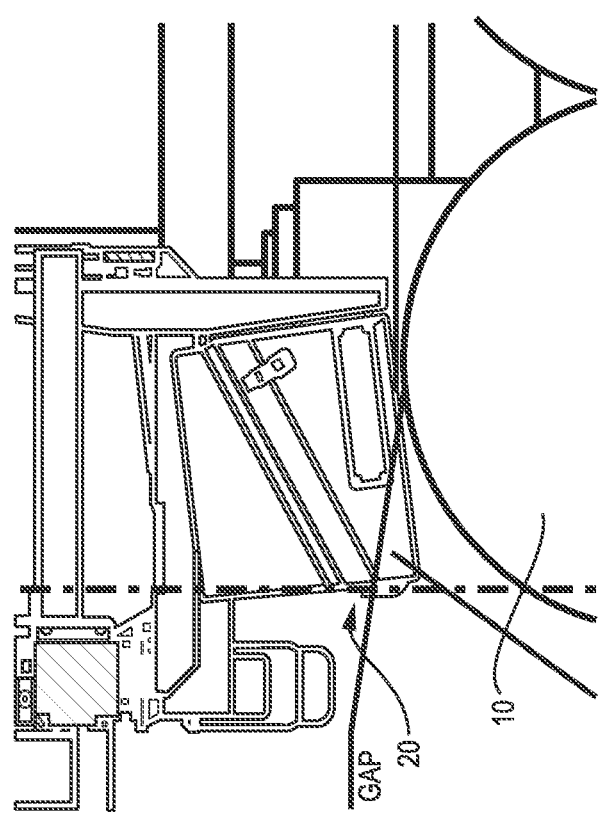
FIG. 1 shows an example X-ray sensor head arrangement for a web gauging process.

In the example now considered, XRF measurement of a basis weight or coating weight on a cylindrically-shaped substrate will be discussed. It will be understood that different X-ray techniques and/or different material quantity measurements and/or different substrate shapes may be used as alternatives. For example, the X-ray signal can be from X-ray scattering. It should be apparent how to vary the approach disclosed below in such circumstances. Also, measurements may be only taken at specific positions on the surface of the substrate (termed "binned" values or positions), in this example.

The table below indicates the parameters used in the specific example considered at this stage.

| Parameter | Description | Example value or comment |
|---|---|---|
| T | Integration time for each position | 1 s |
| V | Line speed | 60 m/min = 1 mm/ms |
| R | Roll radius | 350 mm |
| $\dot{\phi}_{roll}$ | Angular roll speed | =v/U |
| U | Roll circumference | =2πR |
| L | Roll width | 1500 mm |
| X, φ | Binned value of roll position | |
| $x_{Bin, size}$ | Bin size in length direction | 20 mm |
| $\phi_{Bin, size}$ | Bin size in angular direction | =$x_{Bin, size}$/U |
| V | Detector voltage | |
| $t_{sampling}$ | Sampling rate | 10 ms |
| V(x, φ) | Averaged and normalized sensor voltage at X, φ | |
| $V_s$ | Saturation voltage | |
| $V_0$ | Normalized shutter open voltage of substrate for calibration | |
| $V_{0, Sub}$ | Normalized shutter open voltage of substrate | |
| V(x, φ) | Averaged and normalized sensor voltage at X, φ | |
| $V_j(x, φ)$ | Averaged and normalized sensor voltage at X, φ | |
| $\Delta V_0$ | Threshold for voltage differentiation between calibrated and different substrate | 20 mV |

-continued

| Parameter | Description | Example value or comment |
|---|---|---|
| $cw_i$ | Coating weight equivalent of sample I for measuring on substrate of the original calibration | |
| $cw_{i,\,meas}(x, \phi)$ | Measured coating weight of external sample i at X, $\phi$ | |
| $\Delta cw_{meas}$ | Max. allowed measured coating weight difference before compensation is done | Depends on $\Delta V_0$ and calibration curve |
| $cw_{eff}(x, \phi)$ | Effective coating weight using primary calibration curve | |
| N | Number of calibration samples | <5 |
| $g(\vec{T}, p)$ | Temperature compensation factor as a function of temperature and pressure | |
| M | Number of air columns | 4 |
| $\vec{T}$ | M-dimensional temperature vector | |
| $c_{air}$ | density of air, derived at standard pressure (1013 hPa) and 0° C., assuming ideal gas law | 3.487E−4 g*K/cm³/hPa |
| $\mu_{air}$ | mass absorption coefficient of air | Depends on operation parameters and substrate material |
| $d_{air_i}$ | Length of air column i | |

A measurement of a material on the substrate (an open beam measurement) is taken at a specific position, identified by the cylindrical coordinates of the substrate $(x,\phi)$) and this may be correlated with a binned position $(X,\phi)$). This measurement is nominally taken at a specific time, t, but is in fact taken over a time period (T) and the voltage value results from the time-averaged, integrated measurement over that period. This measured X-ray voltage signal is therefore identified as $V(x,\phi,t)$.

Figure 2:
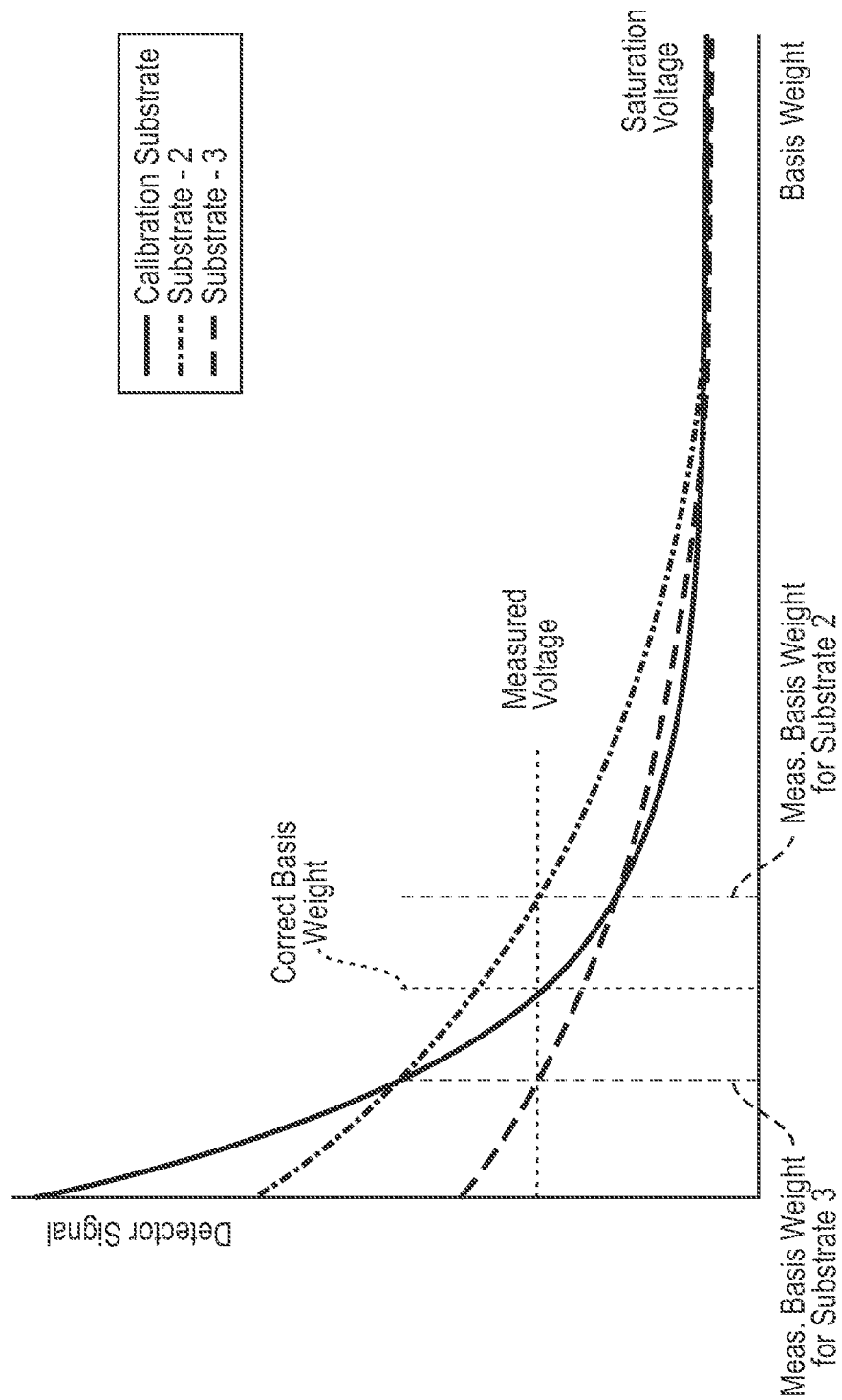
FIG. 2 depicts typical XRF calibration curves showing X-ray detector signal against basis weight for different substrates.

Referring next to FIG. 2, there are depicted typical XRF calibration curves showing X-ray detector signal against basis weight for different substrates. For all substrates, it can be seen that the detector signal reduces with increased basis weight, but eventually saturates. This defines the saturation voltage, Vs. The saturation voltage is dependent on the material positioned on the substrate and does not typically change as the substrate composition is adjusted.

The curve (and particularly its slope, which defines a mass attenuation coefficient and the open beam voltage for the bare substrate) changes for different substrate compositions. As can be seen in the drawing shown, for a specific signal (e.g., a measured voltage), the correct basis weight can be identified if the correct curve is used. In addition, the curve may differ between measured positions on the substrate. The compensation technique disclosed herein allows the correct curve to be identified for a specific substrate and for a specific position on the substrate.

The compensation for the substrate composition is performed in the following way (algorithmically shown in the flow chart of FIG. 5, as discussed below).

First, the open beam measurement is compensated by normalization, so as to be identical for all substrates after saturation voltage subtraction. This is implemented in accordance with equation (1) below.

$$V_J(x, \phi, t) = \begin{cases} \dfrac{V(x, \phi, t) - V_S}{V_{0,Sub}(x, \phi) - V_S} & \text{for } |V_{0,Sub}(x, \phi) - V_0| > \Delta V_0 \\ \dfrac{V(x, \phi, t) - V_S}{V_0(x, \phi) - V_S} & \text{for } |V_{0,Sub}(x, \phi) - V_0| < \Delta V_0 \end{cases} \forall\, t \quad (1)$$

After substrate compensation, the measurement may now be temperature compensated, using equation (2) below.

$$V_{J,Temp}(x, \phi, t) = b(x, \phi) * g(\vec{T}(t), p(t)) * V_J(x, \phi, t) \quad (2)$$

This uses a (non-position dependent) temperature compensation factor $g(\vec{T}(t), p(t))$, which may be calculated at a specific time, in accordance with the pressure (p(t)) and temperature ($T_i(t)$) at that time and a reference pressure ($p_{ref}$ and temperature $T_{i,ref}$) for multiple air columns, using equation (3) below.

$$g(\vec{T}(t), p(t)) = \prod_{i=1}^{M}\left[1 + c_{air} \cdot \mu_{air_i} \cdot \left(\frac{p(t)}{T_i(t)} - p_{ref}T_{i,ref}\right) \cdot d_{air_i}\right] \quad (3)$$

The detection voltage is now compensated and can be linearized using a primary calibration curve based on a polynomial regression of a mass attenuation coefficient, based on equation (4) below.

$$V_{J,Temp}(x, \phi, t) = (V_0 - V_S) * \exp\left(\sum_{k=0}^{K} c_k * cw_{eff}(x, \phi, t)^k\right) \quad (4)$$

However, the real mass attenuation coefficient is different compared to the primary calibration curve. Therefore, a compensation for spectral changes is performed using equation (5) below.

$$cw_{compensated}(x, \phi, t) = a(x, \phi) * cw_{eff}(x, \phi, t) \quad (5)$$

Thus, the compensation parameters to be established are: the normalized shutter open voltage $V_{0,Sub}(x,\phi)$; the temperature compensation coefficient $(b(x,\phi))$; and the spectral changes coefficient $(a(x,\phi))$. These are all position dependent (that is, they may vary according to the position on the substrate). For use during production, they are preferably stored in a database, typically provided in non-volatile memory. The methods for establishing these compensation parameters are discussed below.

In general terms, there may be considered a method for compensating for substrate variation in measurement of material quantity of a material positioned on a substrate. The method comprises: receiving a detected X-ray signal for a measurement of the material at a position on a surface of the substrate (in particular, the material being on and optionally in contact with the substrate); and determining a material quantity based on the received X-ray measurement signal and a pre-determined set of compensation parameters for the substrate, the set of compensation parameters varying according to the position on the surface of the substrate. The determination of material quality may be based on any form of X-ray analysis, for example XRF analysis or X-ray scattering analysis. In some implementations, the material quantity indicates a material thickness, a coating weight and/or basis weight. In some implementations, the material property can also be a thickness of a chemically or electrodeposition, such as on a metal sheet or foil. The steps of receiving and determining are advantageously repeated for multiple positions on the surface of the substrate.

Any of the aspects disclosed herein may be embodied as a computer program, configured when executed by a processor to carry out any method as herein disclosed (or having steps that correspond with each step of a method herein disclosed, to cause a processor to carry out the method step). The processor may be coupled to an X-ray analysis system for receiving suitable signals and/or controlling the system according to the method.

In another aspect, an X-ray analysis system for measurement of material quantity of a material positioned on a substrate may be considered. The system may comprise: an X-ray sensor, configured for detecting an X-ray signal for a measurement of the material at a position on a surface of the substrate; and a processor for compensating for substrate variation in the measurement, the processor being configured to determine a material quantity based on the detected X-ray measurement signal and a pre-determined set of compensation parameters for the substrate, the set of compensation parameters varying according to the position on the surface of the substrate. The system may have features and/or the processor may be configured in accordance with any other aspect disclosed herein.

Certain optional and/or advantageous features in accordance with any aspect will now be discussed.

In some embodiments, the substrate surface has a cylindrical shape. Each position on the surface of the substrate may then be defined by a position along a width of the substrate surface (x) and a rotational angle of the substrate ($\phi$).

The detected X-ray signal may comprise a sensor output, either voltage sampled or charge integrated. Typically, the X-ray signal is then time-averaged over a measurement time period (of predetermined and/or fixed duration, for example).

In one example, the step of determining a material quantity comprises adjusting the received X-ray measurement signal according to the set of compensation parameters. Then, the adjusted X-ray measurement signal may be correlated with material quantity according to a calibration relationship (between signal and material quantity). The calibration relationship may be represented by a curve and the parameters of the curve may be selected according to a standard, for instance.

In embodiments, the set of compensation parameters comprises a predetermined shutter open signal for the substrate (or more specifically, each position on the substrate). The received X-ray measurement signal may then be adjusted by normalizing it according to the predetermined shutter open signal (for the measured position). In embodiments, the set of compensation parameters comprises a predetermined temperature compensation coefficient. Then, the received X-ray measurement signal may then be adjusted by compensating it for temperature and applying the predetermined temperature compensation coefficient. In embodiments, the set of compensation parameters comprises a predetermined spectral adjustment coefficient. Then, the material quantity may be determined by applying the predetermined spectral adjustment coefficient to a material quantity determined by correlating according to the (standard) calibration relationship.

Further reference to general terms of the disclosure will be continued below. First, specific details of methods for establishing compensation parameters are now discussed.

An example process for determined the compensation parameters comprises the following steps. First, a shutter open voltage mapping of the substrate at room temperature is performed. Then, a simulated measurement of an equivalent sample at room temperature is performed to determine a slope adjustment or curve modification parameter. Finally, a simulated measurement of an equivalent sample for roll at a high temperature is performed to determine temperature compensation adjustment parameters. It is desirable that these steps are performed in this order, so that the previously established parameters may be used in correctly establishing the other parameters.

Figure 3:
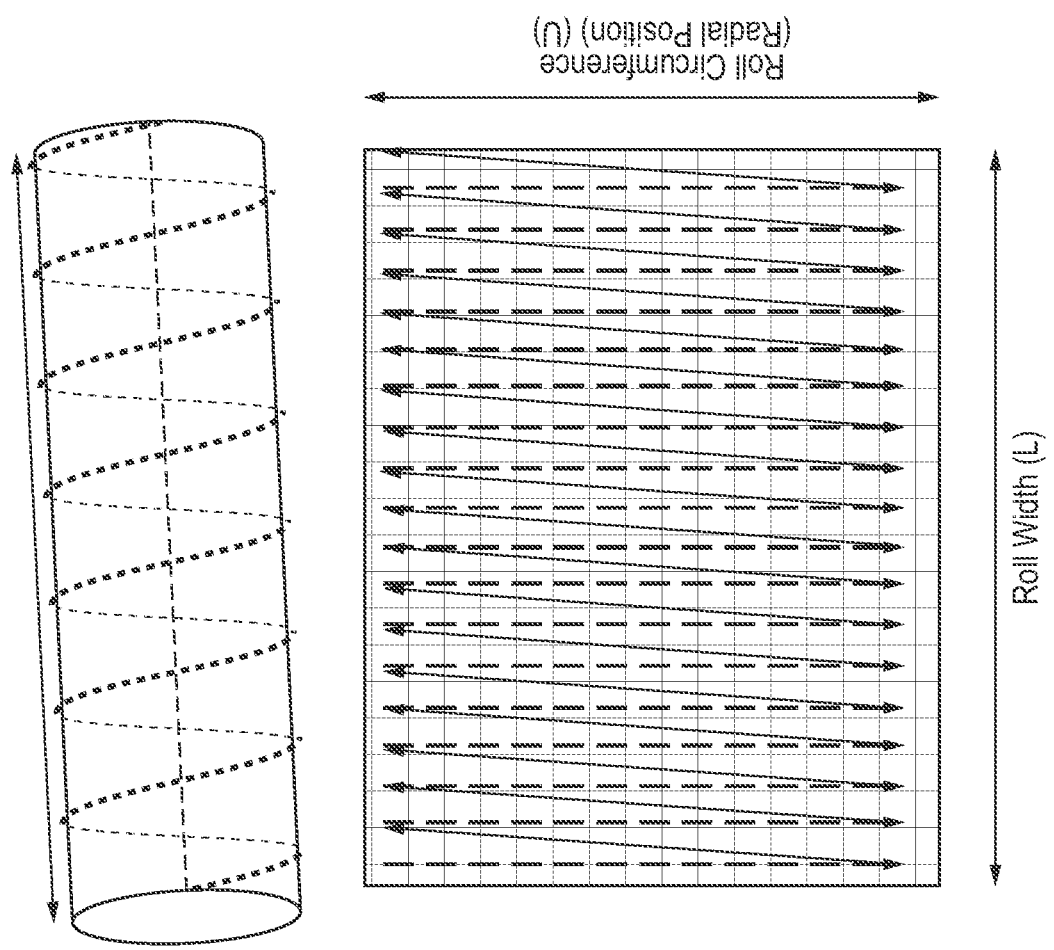
FIG. 3 illustrates measurement at different positions of a cylindrically shaped substrate.

Reference is now made to FIG. 3, in which there is illustrated measurement at different positions of a cylindrically shaped substrate (roll). The roll has a width (L) and a circumference (U). Therefore, each measurement at a specific point along the width (x) and at a specific orientation angle of the roll ($\phi$) can be translated into a two-dimensional position on a planar surface. The measurements require a relative movement of the sensor and the different positions on the cylindrically shaped substrate. In one implementation, the sensor is kept at a specific position on the width and the roll is rotated in angular steps by 360 degrees, such that multiple angular positions for that width point are measured. In another implementation, the roll may be in continuous rotation (e.g., as for standard operation condition and the sensor is moved along the width and the roll rotation is repeated.

The shutter open voltage mapping of the substrate is performed by measurement of the bare roll (that is, no material on the substrate and/or no material interposing between the substrate and the X-ray sensor).

The time-averaged, standardized voltage of the substrate $V_{0,Sub}(x,\phi)$ (shutter open voltage) is established for a defined time window T at a specific position on the roll, according to equation (6) below. In other words, the shutter open voltage is established as the determined voltage measurement when no material is positioned on the substrate.

$$V_{0,Sub}(x, \phi) = \frac{1}{T} \int_0^{T'>T} V(x, \phi, t)dt \qquad (6)$$

As discussed above, the sensor stays at the same horizontal position until all data points are filled for $\phi$. The horizontal position of the sensor is then moved for all data points for $\phi$ and this is repeated for each binned value of X.

An approach for establishing a spectral adjustment or slope angle coefficient is now presented. As discussed above, this procedure is advantageously performed after the shutter open voltage has been mapped for the substrate (as discussed above). The procedure is performed with the substrate at room temperature without material positioned thereon.

Optionally, a first process checks the coating deviation. This is performed by measuring the coating weight without sample at any location of the roll after 2D shutter open voltage adaption. The measurement is checked that it does not deviate larger than $\Delta cw_{meas}$ for all positions. If the coating deviation is small enough, it is possible to determine the linear regression parameters for each location and the process can then continue.

The main process for establishing a spectral adjustment or slope angle coefficient is performed with the substrate at room temperature without material positioned thereon.

Instead, a material interposes between the substrate and the sensor, as will be discussed below. The substrate is rotated at standard production speed.

Other substrate surfaces that present a periodically repeating surface to the X-ray head can be similarly treated. For example, a surface of an elongated conveyor belt upon which the object to be analyzed is placed can be described as substantially cylindrical and by a "pseudo" angular position ($\phi'$), defined by using a cylinder with the same circumference U as the conveyor belt length. A stationary substrate (for instance, a planar substrate) can be analyzed using a Cartesian coordinate system, rather than cylindrical coordinates.

Figure 4:
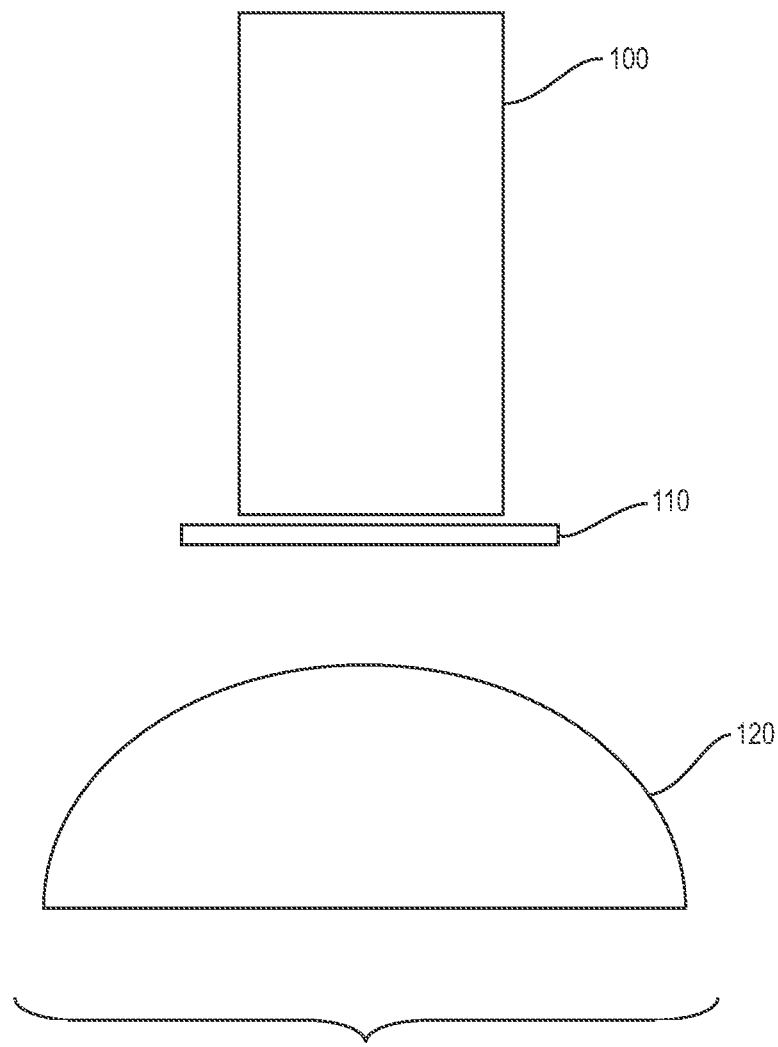
FIG. 4 shows an approach for establishing a spectral adjustment or slope angle coefficient in an embodiment.

Reference is now made to FIG. 4, showing an approach for establishing a spectral adjustment or slope angle coefficient in an embodiment. This shows: a sensor head 100; a sample for measurement 110; and a substrate (roll) 120. Due to the spectral change, for example caused by the varying composition of the substrate 120 and which could therefore be different at different substrate positions, one or more well-known samples 110 are measured at each roll position. The number of samples 110 may depend on the production and may be significantly different based on the application.

It is highly desirable to have the same sample 110 at each measurement position of the roll. Therefore, the sample 110 is beneficially positioned a fixed position (or distance) relative to the sensor head 100, for example by attaching the sample 110 directly to the sensor head 100 during scanning.

The sensor then performs the same mapping motion as shown with respect to FIG. 3, for the bare roll case. The following sequence is performed. The coating weight of the sample is mapped and the linear regression for parameter set $a(x,\phi)$ at each position is performed, according to equation (7) below. Hence, the 2D array $a(x,\phi)$ defines the spectral changes at each position in the measurement space and does not require any additional information about the chemical composition of the different substrate.

$$\sum_{i=1}^{N} a(x, \phi) * cw_{i,meas}(x, \phi) - cw_i = 0; \forall\ a(x, \phi), x, \phi \quad (7)$$

This process may be repeated for multiple samples 110. Several examples for the number of samples may be considered based on the characteristics of the production line under consideration. For instance, if the line is running only a single basis weight of a single coating material, it may be sufficient to use only this basis weight for a single sample. If the line runs different thicknesses or different coating materials, then the samples should cover the entire measurement range to perform a proper Gain/Offset adjustment. For very large production ranges, it may be desirable to separate the measurement range and the parameters into sub-sets. If the sample material 110 is brittle and cannot be attached directly to the sensor head 100 or otherwise securely positioned, it may be possible to use a similar material (in terms of XRF or Compton response) to simulate the production. As a result, multiple sets of spectral adjustment or slope angle coefficients may be established for different thickness ranges and/or materials.

The resultant set or sets of spectral adjustment or slope angle coefficient parameters $(a(x,\phi))$ are then beneficially stored in the non-volatile memory database.

An approach for establishing a temperature compensation coefficient is now considered. Desirably, this approach is performed after the shutter open voltage and slope adjustment have both been mapped successfully for the substrate. Like the process for establishing the shutter open voltage, the substrate is measured without any material positioned thereon and without any material interposing between the substrate and the sensor (in other words, any sample material used for slope adjustment establishment is removed). The substrate (for instance, roll) is heated to a temperature higher than room temperature and typically rotated at standard production speed.

Spectral change may result in different temperature compensation parameters for each position $(x,\phi)$. This may result in different absorption coefficients of the air. Since the spectrum at each position is unknown, it is measured using a warmed-up roll without external samples.

The following sequence is performed. First, the voltage is measured without sample at each location of the roll after 2D shutter open voltage adaption (in accordance with equation (6) above). Then, a temperature compensation adjustment parameter $(b(x,\phi))$ is established for each position $(x,\phi)$ according to equation (8) below, where $g(\vec{T}(t), p(t))$ is calculated in accordance with equation (3) above.

$$b(x, \phi) = \frac{V(x, \phi)}{V_0 * g(\vec{T}, p)} \quad (8)$$

The resultant set of temperature compensation parameters $(b(x,\phi))$ are then beneficially stored in the non-volatile memory database.

Returning to the general terms discussed above, a further aspect may be considered (which may be provided independently or in combination with any other aspect disclosed herein). This provides a method for determining compensation parameters for substrate variation in measurement of material quantity of a material positioned on a substrate. The method comprises: obtaining at least one detected X-ray signal for each of a plurality of positions on a surface of the substrate; and establishing a set of compensation parameters for each position on the surface of the substrate, based on the respective at least one detected X-ray signal. In one respect, the step of obtaining may result in one detected X-ray signal for each of a plurality of positions on a surface of the substrate (at a specific different condition). Then, the step of establishing may result in one compensation parameter for each position on the surface of the substrate. The steps of obtaining and establishing may then be repeated for different types of compensation parameter. As will be understood in an alternative respect, the step of obtaining may result in a plurality of detected X-ray signal for each of a plurality of positions on a surface of the substrate (generally obtained at different times and under different conditions). Then, the step of establishing may result in multiple compensation parameters for each position on the surface of the substrate.

All of the details discussed above (for instance, with reference to the general terms of the disclosure) may apply to this aspect. For example, the obtained detected X-ray signal may comprise a sensor output, either voltage sampled or charge integrated. Typically, the X-ray signal is then time-averaged over a measurement time period. The possible compensation parameters will now be discussed.

For instance, the set of compensation parameters may comprise a shutter open signal for the substrate. Then, the at least one detected X-ray signal may comprise an X-ray signal obtained for each position on the surface of the substrate when no material is positioned on the substrate (at a first temperature, for instance room temperature). Then, and establishing a set of compensation parameters may comprise defining the shutter open signal for each position on the surface of the substrate by the respective obtained detected X-ray signal (which may comprise a sensor output, either voltage sampled or charge integrated and typically, the X-ray signal is then time-averaged over a measurement time period, as discussed above).

In another example, the set of compensation parameters comprises a spectral adjustment coefficient for the substrate. Then, the at least one detected X-ray signal may comprise an X-ray signal obtained for each position on the surface of the substrate when a material of a known material quantity is positioned at a predetermined position (or distance) relative to the X-ray sensor. For example, the material of a known material quantity may be attached to the X-ray sensor. Then, establishing a set of compensation parameters may comprise establishing the spectral adjustment coefficient for each position on the surface of the substrate by identifying a material quantity for the respective position from correlating an X-ray measurement signal derived from the obtained X-ray measurement signal for the respective position with material quantity according to a calibration relationship and comparing the identified material quantity with the known material quantity. Advantageously, the X-ray measurement signal derived from the obtained X-ray measurement signal comprises the obtained X-ray measurement signal for the respective position by the shutter open signal for the respective position.

In a further example, the set of compensation parameters comprises a temperature compensation coefficient for the substrate. Then, the at least one detected X-ray signal may comprise an X-ray signal obtained for each position on the surface of the substrate when no material is positioned on the substrate at a second, different temperature (typically, higher than the first temperature). Establishing a set of compensation parameters may then comprise calculating a temperature compensation factor for the second temperature and establishing the temperature compensation coefficient for each position on the surface of the substrate by comparing an X-ray signal obtained for the respective position at the first temperature adjusted by the temperature compensation factor with the obtained X-ray signal obtained for the respective position at the second temperature.

Figure 5:
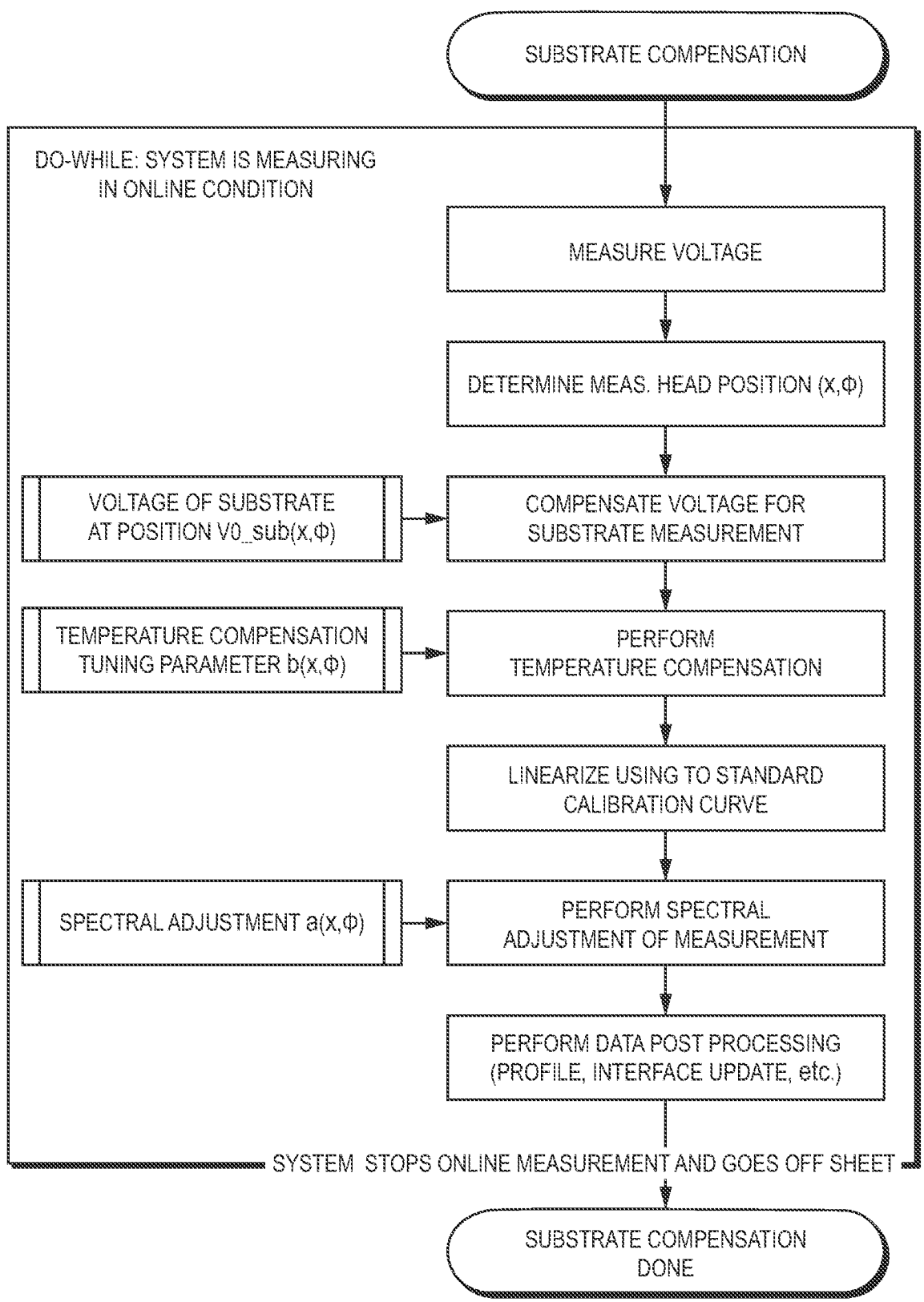
FIG. 5 depicts a flow chart of a compensation algorithm according to an embodiment.

Referring next to FIG. 5, there is depicted a flow chart of a compensation algorithm. This can be seen to be in accordance with the discussion above for the method of compensation of a voltage measurement. This comprises the steps of, while the system is measuring in an online condition: measure a voltage; determine measured sensor head position $(x, \phi)$; compensate voltage for substrate measurement using the open shutter voltage for that position $(V_{0,sub}(x,\phi))$; perform temperature compensation using the temperature compensation coefficient (tuning parameter), $b(x,\phi)$; linearize the measurement using a standard calibration curve; perform spectral adjustment of the measurement using the spectral adjustment coefficient, $a(x,\phi)$; and perform data post-processing (profile, interface update, etc.). The system then stops online measurement and goes to a parking position. Although voltage measurements are shown in this respect, the same technique can equivalently be used for charge measurements.

Figure 6:
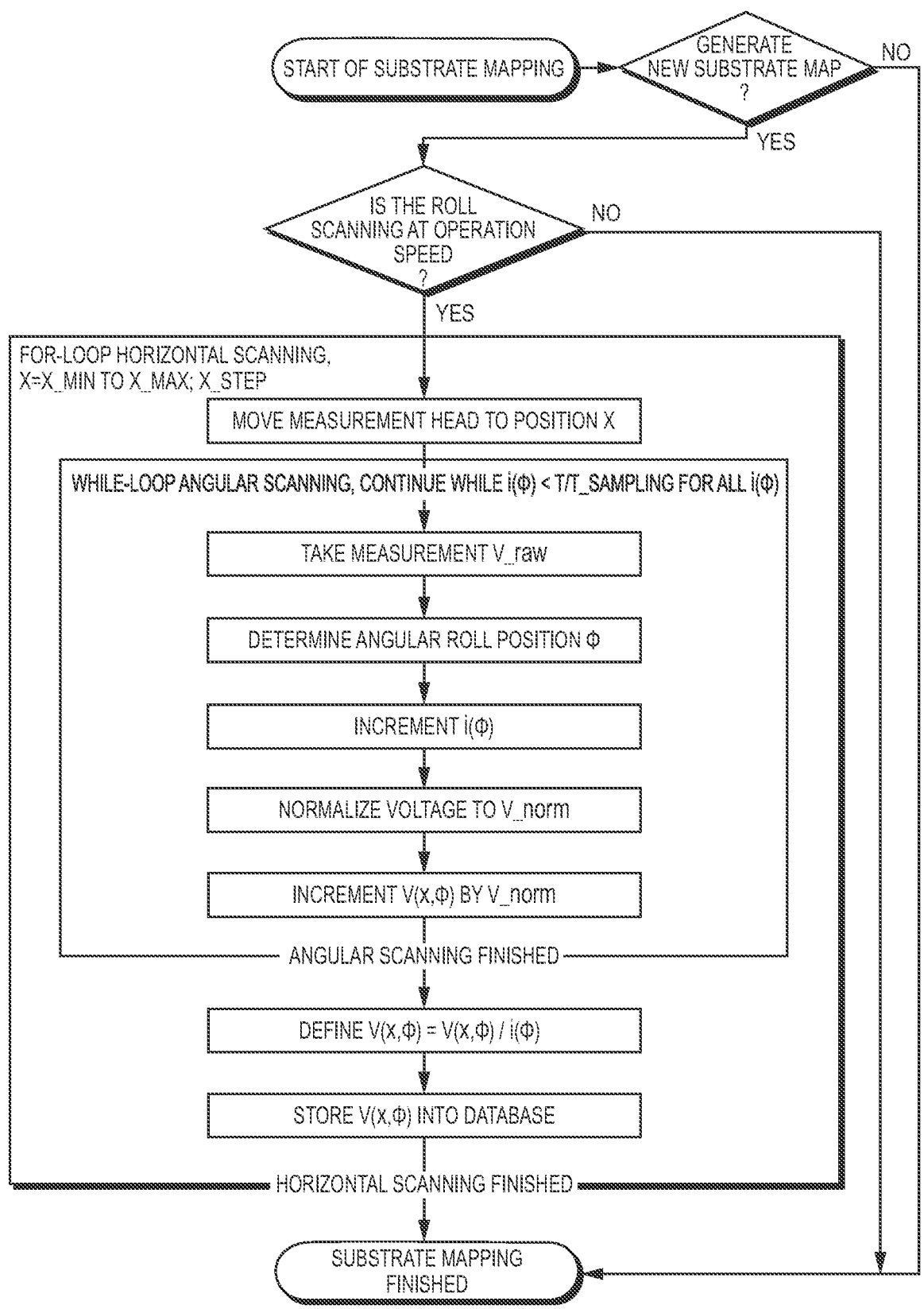
FIG. 6 depicts a flow chart of substrate mapping according to an embodiment.

FIG. 6 depicts a flow chart of substrate mapping, in accordance with the procedure discussed above. First, the system determines that a new substrate map is being generated and that the roll scanning is at operation speed. A first loop conducts horizontal scanning from $X=X_{min}$ to $X_{max}$ in steps of size $X_{step}$. Within the first loop, a second loop conducts angular scanning and continues whilst the number of iterations ($i(\phi)$) is less than the integration time divided by the sampling rate. For each run of the second loop, the following steps are conducted: a voltage measurement is taken, $V_{raw}$; the angular roll position ($\phi$) is determined; the iteration number ($i(\phi)$) is incremented; the voltage measurement is normalized by $V_0$ to $V_{norm}$; and $V(x,\phi)$ is incremented by $V_{norm}$. Within the first loop, after the second loop has completed, the following further steps are performed: $V(x,\phi)$ is defined as $V(x,\phi)/i(\phi)$; and $V(x,\phi)$ is then stored in a database.

Figure 7A:
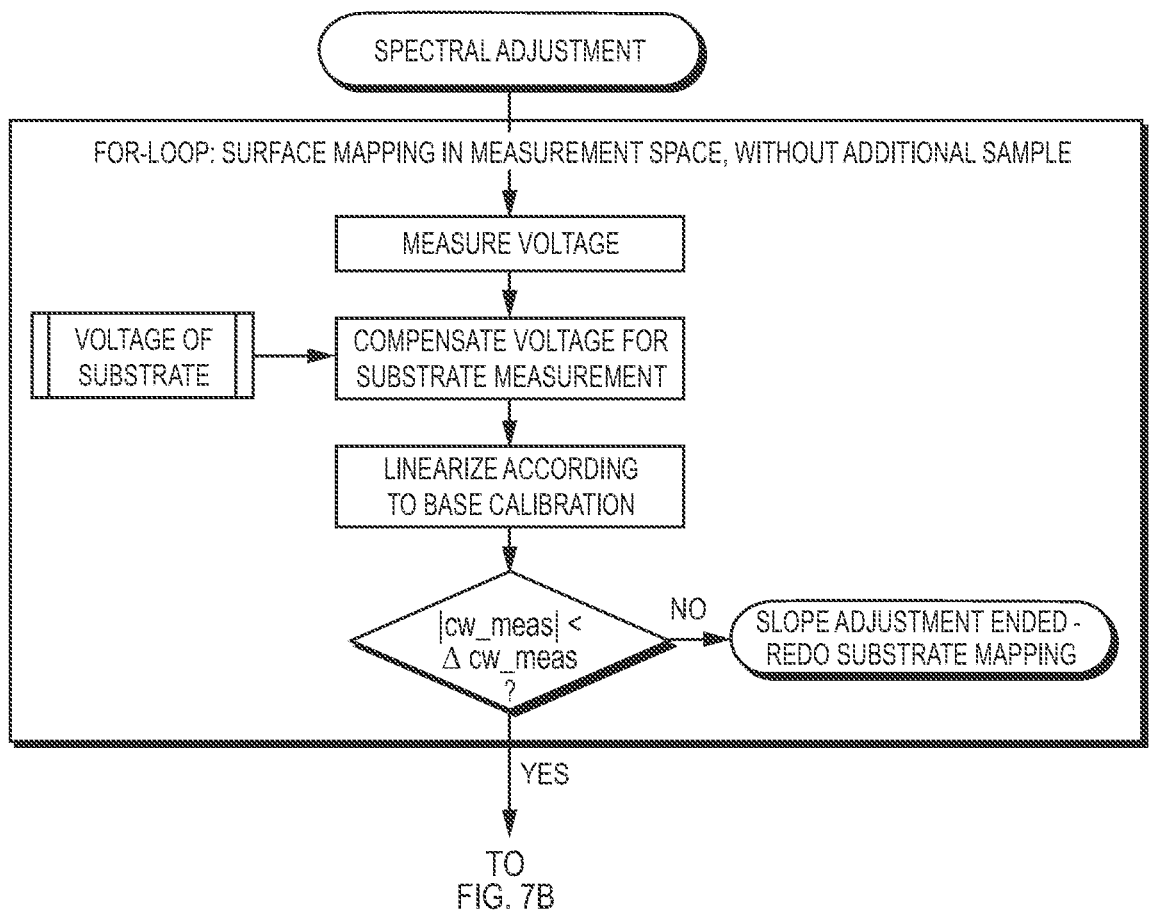
FIGS. 7A and 7B depicts a flow chart of an algorithm for establishing a spectral adjustment or slope angle parameter according to an embodiment.
Figure 7B:
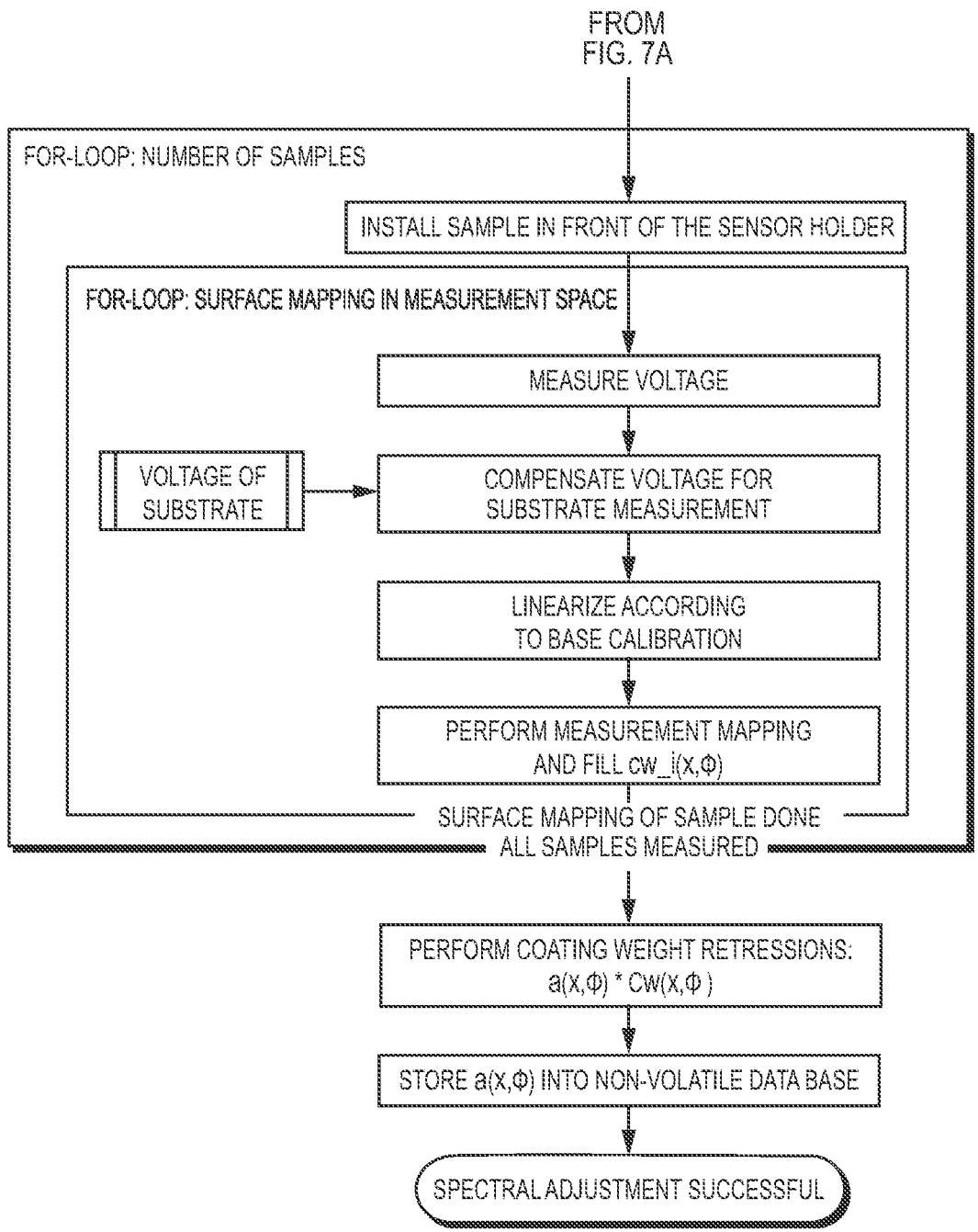

FIGS. 7A and 7B depict a flow chart of an algorithm for establishing a spectral adjustment or slope angle parameter. This is in line with the procedure described above. A first loop conducts a surface mapping in the measurement space, without an additional sample. For each position: a voltage is measured; the measured voltage is compensated using the open shutter voltage for that position; the compensated voltage is linearized according to a base calibration to find a measured basis width, $cw_{meas}$; and if the magnitude of the measured basis width, $|cw_{meas}|$ is not less than a maximum allowed measured coating weight difference before compensation is done, $\Delta cw_{meas}$, the process is stopped (and restarted). Otherwise, the process continues, with a procedure for each sample, which begins with the sample being installed in front of the sensor holder (as shown in FIG. 4). A second loop conducts a surface mapping in the measurement space with the installed sample, using the following steps for each position: a voltage is measured; the measured voltage is compensated using the open shutter voltage for that position; the compensated voltage is linearized according to a base calibration; and a measurement mapping is performed to fill $cw_i(x,\phi)$. Once the second loop is completed for all samples, a coating weight regression is performed to find $a(x,\phi)$ and the determined parameters are stored in a database.

Figure 8:
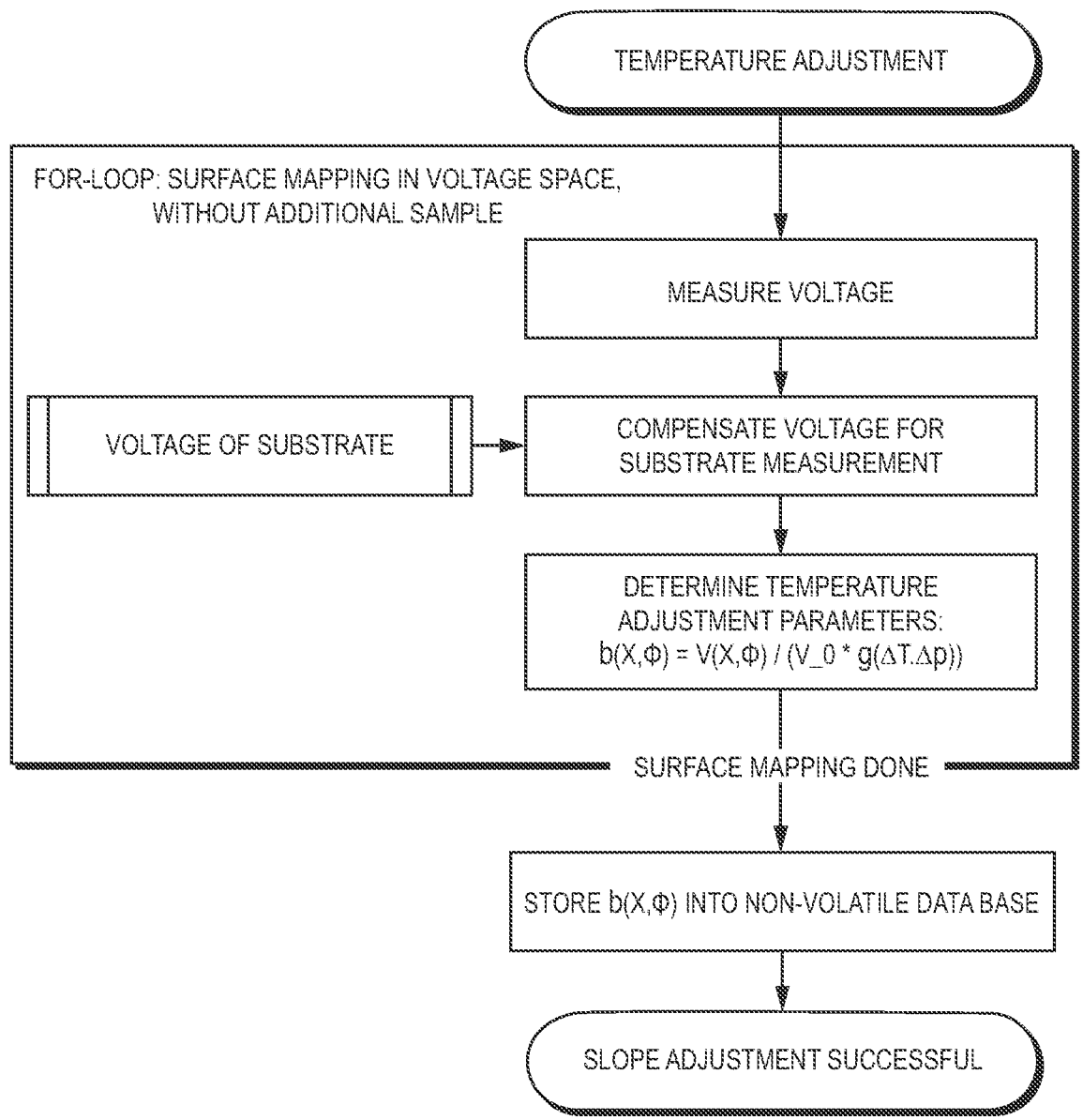
FIG. 8 depicts a flow chart of an algorithm from establishing a temperature compensation parameter according to an embodiment.

FIG. 8 depicts a flow chart of an algorithm from establishing a temperature compensation parameter according to an embodiment. This likewise according to the procedure discussed above. A surface mapping is conducted in the measurement space with no sample installed, using the following steps for each position: a voltage is measured; the measured voltage is compensated using the open shutter voltage for that position; and a temperature compensation adjustment parameter ($b(x,\phi)$) is established for the position according to equation (8) above. Once the loop is complete, the determined parameters are stored in a database.

The time taken to calibrate (determine the compensation parameters) can be estimated as follows. The first procedure (bare roll mapping, for instance according to the flow chart of FIG. 6) may have a time duration according to the following expression.

$$\text{Mapping time} = \frac{L}{x_{Bin,size}} * \frac{U}{x_{Bin,size}} * T = 2.3h + \text{scanner movement time}$$

This may be approximately 3 hours in practice.

The second procedure (spectral adjustment, for instance according to the flow chart of FIGS. 7A and 7B) may have a time duration for each sample according to the following expression.

$$\text{Mapping time} = \frac{L}{x_{Bin,size}} * \frac{U}{x_{Bin,size}} * T = 2.3h + \text{scanner movement time}$$

This may be approximately 3 hours in practice.

The third procedure (temperature compensation adjustment, for instance according to the flow chart of FIG. 8) may have a time duration for each sample according to the following expression.

$$\text{Mapping time} = \frac{L}{x_{Bin,size}} * \frac{U}{x_{Bin,size}} * T = 2.3h + \text{scanner movement time}$$

This may be approximately 3 hours in practice.

Thus an estimate of the total time for N samples in practice may be given by 3h+N*3h+additional warm-up time of the substrate if necessary.

FIG. 9 illustrates a 2D array of the spectral adjustment parameters (a(x,ϕ)) and the temperature adjustment parameter (b(x,ϕ)) that are stored in the database, according to an embodiment. The illustration is for a roll having a width of 100 length units (e.g., mm, cm, m). For the measurement, the width is subdivided into 10 equal portions between 5 and 95 inclusive; and the circumference is subdivided into 10 equal angular portions between 18 and 342 inclusive. The first two columns corresponding to x=5 and x=15 are filled for orientation angles of the roll ϕ=18° through 342°. It is understood that when the mapping is complete all of the cells would be filled with the specific values for a(x,ϕ) and b(x,ϕ).

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an analogue to digital convertor) means "one or more" (for instance, one or more analogue to digital convertor). Throughout the description and claims of this disclosure, the words "comprise", "including", "having" and "contain" and variations of the words, for example "comprising" and "comprises" or similar, mean "including but not limited to", and are not intended to (and do not) exclude other components.

The following numbered paragraphs 1-24 provide various examples of the embodiments disclosed herein.

Paragraph 1. A method for compensating for substrate variation in measurement of material quantity of a material positioned on a substrate, the method comprising: receiving a detected X-ray signal for a measurement of the material at a position on a surface of the substrate; and determining a material quantity based on the received X-ray measurement signal and a pre-determined set of compensation parameters for the substrate, the set of compensation parameters varying according to the position on the surface of the substrate.

Paragraph 2. The method of paragraph 1, wherein the substrate surface has a substantially cylindrical shape, each position on the surface of the substrate being defined by a position along a width of the substrate surface and a rotational angle of the substrate.

Paragraph 3. The method of paragraph 1 or paragraph 2, wherein the material quantity indicates a material weight and/or basis weight.

Paragraph 4. The method according to any of paragraphs 1-3, wherein the material quantity indicates a deposition or coating weight, basis weight or thickness.

Paragraph 5. The method according to any of paragraphs 1-4, wherein the detected X-ray signal comprises a sensor output, either voltage sampled or charge integrated, and time-averaged over a measurement time period.

Paragraph 6. The method according to any of paragraphs 1-5, wherein the steps of receiving and determining are repeated for multiple positions on the surface of the substrate.

Paragraph 7. The method according to any of paragraphs 1-6, wherein the step of determining a material quantity comprises adjusting the received X-ray measurement signal according to the set of compensation parameters and correlating the adjusted X-ray measurement signal with material quantity according to a calibration relationship.

Paragraph 8. The method according to any of paragraphs 1-7, wherein the set of compensation parameters comprises a predetermined shutter open signal for the substrate and adjusting the received X-ray measurement signal comprises normalizing the received X-ray measurement signal according to the predetermined shutter open signal.

Paragraph 9. The method according to any of paragraphs 1-8, wherein the set of compensation parameters comprises a predetermined temperature compensation coefficient and adjusting the received X-ray measurement signal comprises compensating the received X-ray measurement signal for temperature and applying the predetermined temperature compensation coefficient.

Paragraph 10. The method according to any of paragraphs 1-9, wherein the set of compensation parameters comprises a predetermined spectral adjustment coefficient and determining a material quantity comprises applying the predetermined spectral adjustment coefficient to a material quantity determined by correlating according to the calibration relationship.

Paragraph 11. A method for determining compensation parameters for substrate variation in measurement of material quantity of a material positioned on a substrate, the method comprising: obtaining at least one detected X-ray signal for each of a plurality of positions on a surface of the substrate; and establishing a set of compensation parameters for each position on the surface of the substrate, based on the respective at least one detected X-ray signal.

Paragraph 12. The method according to paragraph 11, wherein the set of compensation parameters comprises a shutter open signal for the substrate, the at least one detected X-ray signal comprises an X-ray signal obtained for each position on the surface of the substrate when no material is positioned on the substrate at a first temperature and establishing a set of compensation parameters comprises defining the shutter open signal for each position on the surface of the substrate by the respective obtained detected X-ray signal.

Paragraph 13. The method according to paragraph 11 or paragraph 12, wherein the set of compensation parameters comprises a spectral adjustment coefficient for the substrate, the at least one detected X-ray signal comprises an X-ray signal obtained for each position on the surface of the substrate when a material of a known material quantity is positioned at a predetermined position relative to an X-ray sensor and establishing a set of compensation parameters comprises establishing the spectral adjustment coefficient for each position on the surface of the substrate by identifying a material quantity for the respective position from correlating an X-ray measurement signal derived from the obtained X-ray measurement signal for the respective position with material quantity according to a calibration relationship and comparing the identified material quantity with the known material quantity.

Paragraph 14. The method according to any of paragraphs 11-13, wherein the X-ray measurement signal derived from the obtained X-ray measurement signal comprises the obtained X-ray measurement signal for the respective position by the shutter open signal for the respective position.

Paragraph 15. The method according to any of paragraphs 11-14, wherein the set of compensation parameters comprises a temperature compensation coefficient for the substrate, the at least one detected X-ray signal comprises an X-ray signal obtained for each position on the surface of the substrate when no material is positioned on the substrate at a second, different temperature and establishing a set of compensation parameters comprises calculating a temperature compensation factor for the second temperature and establishing the temperature compensation coefficient for each position on the surface of the substrate by comparing an X-ray signal obtained for the respective position at the first temperature adjusted by the temperature compensation factor with the obtained X-ray signal obtained for the respective position at the second temperature.

Paragraph 16. The method according to any of paragraphs 1-10, further comprising the method according to any of paragraphs 11-15

Paragraph 17. A computer readable medium comprising a computer program, the computer program being configured when executed by a processor to carry out the method out the method according to any of paragraphs 1-10.

Paragraph 18. An X-ray analysis system for measurement of material quantity of a material positioned on a substrate, the system comprising: an X-ray sensor, configured for detecting an X-ray signal for a measurement of the material at a position on a surface of the substrate; and a processor for compensating for substrate variation in the measurement, the processor being configured to determine a material quantity based on the detected X-ray measurement signal and a pre-determined set of compensation parameters for the substrate, the set of compensation parameters varying according to the position on the surface of the substrate.

Although embodiments according to the disclosure have been described with reference to particular types of devices and applications (particularly XRF analysis of roll-based industrial processes) and the embodiments have particular advantages in such case, as discussed herein, approaches according to the disclosure may be applied to other types of device and/or application. The specific structural details of the X-ray system, whilst potentially advantageous (especially in view of known X-ray system constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the aspects of determining a set of compensation parameters and applying a set of compensation parameters to measurements. In particular, the preferred features of the invention are applicable to all aspects of the invention and may be used in any combination. Likewise, features described in non-essential combinations may be used separately (not in combination).

What is claimed is:

1. A method for compensating for substrate variation in measurement of a material positioned on a substrate, the method comprising:
   receiving a detected X-ray signal for a measurement of the material at a position on a surface of the substrate; and
   determining a material quantity based on the received X-ray measurement signal and a pre-determined set of compensation parameters for the substrate, the set of compensation parameters varying according to the position on the surface of the substrate, wherein the surface of the substrate has a substantially cylindrical shape, each position on the surface of the substrate being defined by a position along a width of the substrate surface and a rotational angle of the substrate.

2. The method of claim 1, wherein the material quantity indicates a material weight and/or basis weight.

3. The method according to claim 1, wherein the material quantity indicates a deposition or coating weight, basis weight or thickness.

4. The method of claim 1, wherein the detected X-ray signal comprises a sensor output, either voltage sampled or charge integrated, and time-averaged over a measurement time period.

5. The method of claim 1, wherein the steps of receiving and determining are repeated for multiple positions on the surface of the substrate.

6. The method of claim 1, wherein the step of determining a material quantity comprises adjusting the received X-ray measurement signal according to the set of compensation parameters and correlating the adjusted X-ray measurement signal with material quantity according to a calibration relationship.

7. The method of claim 6, wherein the set of compensation parameters comprises a predetermined shutter open signal for the substrate and adjusting the received X-ray measurement signal comprises normalizing the received X-ray measurement signal according to the predetermined shutter open signal.

8. The method of claim 6, wherein the set of compensation parameters comprises a predetermined temperature compensation coefficient and adjusting the received X-ray measurement signal comprises compensating the received X-ray measurement signal for temperature and applying the predetermined temperature compensation coefficient.

9. The method of claim 1, wherein the set of compensation parameters comprises a predetermined spectral adjustment coefficient and determining a material quantity comprises applying the predetermined spectral adjustment coefficient to a material quantity determined by correlating according to the calibration relationship.

10. A computer readable medium comprising a computer program, the computer program being configured when executed by a processor to carry out the method out the method of claim 1.

11. A method for determining compensation parameters for substrate variation in measurement of material quantity of a material positioned on a substrate, the method comprising:
obtaining at least one detected X-ray signal for each of a plurality of positions on a surface of the substrate; and
establishing a set of compensation parameters for each position on the surface of the substrate, based on the respective at least one detected X-ray signal, wherein the surface of the substrate has a substantially cylindrical shape, each position on the surface of the substrate being defined by a position along a width of the substrate surface and a rotational angle of the substrate.

12. The method of claim 11, wherein the set of compensation parameters comprises a shutter open signal for the substrate, the at least one detected X-ray signal comprises an X-ray signal obtained for each position on the surface of the substrate when no material is positioned on the substrate at a first temperature and establishing the set of compensation parameters comprises defining the shutter open signal for each position on the surface of the substrate by the respective obtained at least one detected X-ray signal.

13. The method of claim 11, wherein the set of compensation parameters comprises a spectral adjustment coefficient for the substrate, the at least one detected X-ray signal comprises an X-ray signal obtained for each position on the surface of the substrate when a material of a known material quantity is positioned at a predetermined position relative to an X-ray sensor and establishing the set of compensation parameters comprises establishing the spectral adjustment coefficient for each position on the surface of the substrate by identifying a material quantity for the respective position from correlating an X-ray measurement signal derived from the obtained at least one detected X-ray signal for the respective position with the material quantity according to a calibration relationship and comparing the identified material quantity with the known material quantity.

14. The method of claim 12, wherein X-ray measurement signal obtained for each position derived from the obtained at least one detected X-ray measurement signal comprises the obtained at least one detected X-ray measurement signal for the respective position by the shutter open signal for the respective position.

15. The method of claim 11, wherein the set of compensation parameters comprises a temperature compensation coefficient for the substrate at a first temperature, the at least one detected X-ray signal comprises an X-ray signal obtained for each position on the surface of the substrate when no material is positioned on the substrate at a second temperature and establishing the set of compensation parameters comprises calculating a temperature compensation coefficient for the substrate at the second temperature and establishing a temperature compensation coefficient for each position on the surface of the substrate by comparing an X-ray signal obtained for the respective position at the first temperature adjusted by the temperature compensation factor with the obtained X-ray signal obtained for the respective position at the second temperature.

16. A method for compensating for substrate variation in measurement of a material positioned on a substrate, the method comprising:
obtaining at least one detected X-ray signal for each of a plurality of positions on a surface of the substrate; and
establishing a set of compensation parameters for each position on the surface of the substrate, based on the respective at least one detected X-ray signal;
receiving a detected X-ray signal of the material at a position on a surface of the substrate; and
determining a material quantity based on the received X-ray measurement signal and a pre-determined set of compensation parameters for the substrate, the set of compensation parameters varying according to the position on the surface of the substrate, wherein the surface of the substrate has a substantially cylindrical shape, each position on the surface of the substrate being defined by a position along a width of the substrate surface and a rotational angle of the substrate.

17. An X-ray analysis system for measurement of material quantity of a material positioned on a substrate, the system comprising:
an X-ray sensor, configured for detecting an X-ray signal for a measurement of the material at a position on a surface of the substrate; and
a processor for compensating for substrate variation in the measurement, the processor being configured to determine a material quantity based on the detected X-ray measurement signal and a pre-determined set of compensation parameters for the substrate, the set of compensation parameters varying according to the position on the surface of the substrate, wherein the surface of the substrate has a substantially cylindrical shape, each position on the surface of the substrate being defined by a position along a width of the substrate surface and a rotational angle of the substrate.

* * * * *